Feb. 25, 1958  K. C. ROCK  2,824,953
PHOTOGRAPHIC FLASH UNIT
Filed Feb. 27, 1956

INVENTOR.
KINGSLEY C. ROCK
BY Francis A. Sim
ATTORNEY

United States Patent Office 2,824,953
Patented Feb. 25, 1958

2,824,953

PHOTOGRAPHIC FLASH UNIT

Kingsley C. Rock, Englewood, Colo., assignor to Minneapolis-Honeywell Regulator Company, Minneapolis, Minn., a corporation of Delaware Application February 27, 1956, Serial No. 568,031

2 Claims. (Cl. 240—1.3)

This invention is concerned with a photographic flash unit and more particularly with a photographic flash unit of the so-called electronic type.

One form of photographic flash units employ a capacitor, normally of the electrolytic type, which is charged from a source of direct current voltage and this charged capacitor is then discharged through a photo flash bulb to produce the light source necessary for a acceptable photography. An example of this type of system can be seen in the Stanley D. Eilenberger Patent 2,730,660. This particular patent shows the light source as being a gas discharge tube which when triggered causes the capacitor to discharge through the flash tube itself.

In order to obtain the required light intensity it is necessary to charge this capacitor to a high voltage, for example 500 volts. It has also been found that the capacitance value of the capacitor must also be high, for example in the range of 800 microfarads.

In order to manufacture a photographic flash unit of this type which is of the highest quality and is conveniently usable, the direct current source of voltage of this system is placed in a power-pack which is carried on the person of the photographer. The reflector and flash tube is mounted in a head assembly which is fastened to one end of a tubular type metallic handle which encases the electrolytic capacitor and is adapted to be held by the photographer to obtain off the camera lighting. Two coiled cords are normally provided and extend from the photographic flash unit to the power-pack and to the camera to synchronize actuation of the camera shutter with the flashing of the flash tube of the photographic flash unit.

The high voltage involved in this system makes it undesirable that the handle of the flash unit be in direct contact with the electrolyte of the electrolytic capacitor which is placed inside of the handle. The present invention provides a novel construction whereby the capacitor electrodes, normally a high purity aluminum foil separated by impregnated spacers, normally electrolyte impregnated paper, is wound to form the basic capacitor structure. This assembly in its then incomplete form is placed in a relatively thin bag or tube of insulating material which is impervious to the dielectric and has a high dielectric strength. This assembly, now held in the insulating bag, is inserted in the handle of the photographic flash unit thereby providing an extremely compact and yet high quality and safe photographic flash unit wherein the outer case of the capacitor, which mechanically holds and protects the coiled capacitor electrodes, is the handle by which the photographic flash unit is held.

Such a construction provides a photographic flash unit wherein the metallic member which forms the outer casing of the electrolytic capacitor and mechanically encases the electrolytic capacitor also forms the metallic handle by which the photographic flash unit can be held and to which the head of the photographic flash unit, having the reflector and flash tube, is mechanically mounted.

This construction provides a further advantage in that the metal case, which is the handle for holding the photographic flash unit, can now be constructed of a material other than the material from which the capacitor electrodes are formed. In other words, since the insulating bag is impervious to the electrolyte of the capacitor, there can be no electrolytic action between the capacitor electrodes and the outer case of the capacitor, the handle of the photographic flash unit. If the handle of the photographic flash unit were directly in contact with the electrolyte, and if the handle were made of a metal different from the capacitor electrodes, a battery action would occur and the operator of the photographic flash unit would be handling one plate of a battery.

The accepted material to be used for the electrodes of an electrolytic capacitor is aluminum. An additional advantage afforded by this improved photographic flash unit is that the handle of the photographic flash unit may now be made of a material other than aluminum, for example brass which is chromium plated or stainless steel, if desired. In both of these examples the material can be finished to provide a very pleasing appearance and this finish will be much more durable than if the handle were made of aluminum. Furthermore, since this photographic flash unit is adapted to be hand held it is possible that the unit will be dropped. With the capacitor encased in a material stronger than aluminum the possibility of denting the handle and destroying the capacitor is greatly reduced.

It is therefore an object of the present invention to provide an improved photographic flash unit wherein an electrolytic capacitor is placed in a relatively thin bag of insulating material having a high dielectric strength and then encased in a metallic handle on which the head of the flash unit is mechanically mounted.

It is a further object of the present invention to provide an improved photographic flash unit having a head assembly, including a reflector and flash tube, with the head unit mounted on a metallic handle, which handle forms the outer casing of an electrolytic capacitor and wherein the electrolytic capacitor is encased in a bag or tube of relatively thin dielectric material having a high dielectric strength and being impervious to the electrolyte of the electrolytic capacitor.

These and other objects of the present invention will be apparent to those skilled in the art upon reference to the following specification, claims, and drawings, of which:

Figure 1:
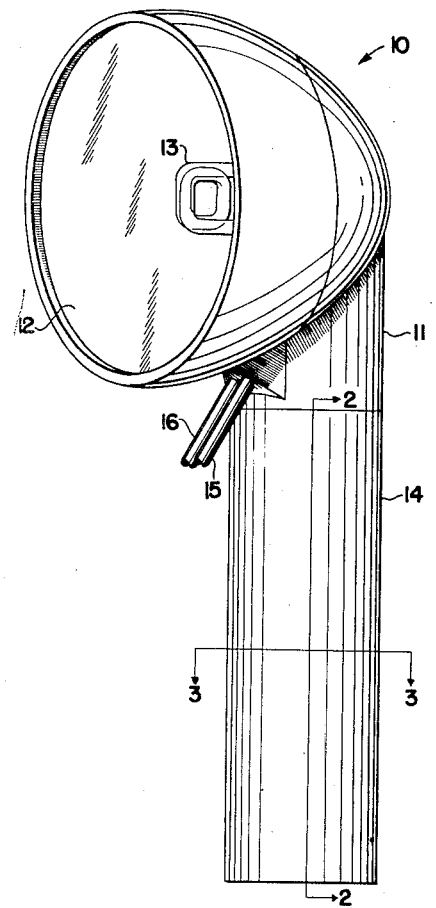
Figure 1 is a showing of the improved photographic flash unit.

Referring specifically to Figure 1, the head of the photoflash unit, or flash gun assembly, is designated generally by the reference numeral 10. This head includes a body or housing member 11, which may be made of a plastic material, a reflector means 12 positioned within and fastened to the body member 11, and a photo flash tube 13 mounted on the body member 11 and positioned with respect to the reflector means 12. The body member 11 of the head 10 is mechanically fastened to a tubular metallic handle 14 which is adapted to be hand held by the photographer to provide off the camera light. As has been mentioned, one of the components of a photographic flash system is an electrolytic capacitor. This electrolytic capacitor is contained within the metallic handle 14 and a coiled cord 15 is provided to connect the capacitor to a direct current source of power, not shown. A second coiled cord 16 is provided and connects to a camera, not shown, to synchronize the actuation of the shutter of the camera with the flashing of the flash tube 13.

Figure 2:
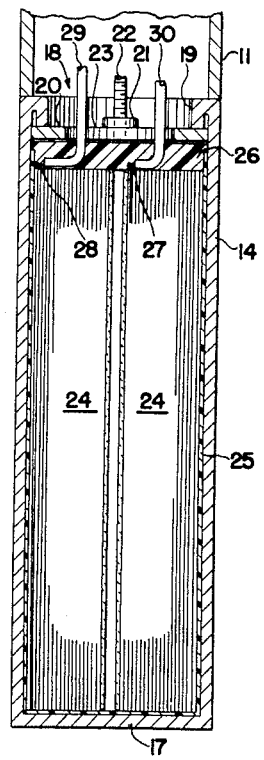
Figure 2 is a showing of a longitudinal section of the handle of the photographic flash unit of Figure 1.
Figure 3:
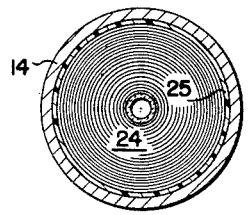
Figure 3 is a cross section of the handle of the photographic flash unit of Figure 1.

Referring now to Figure 2, an expanded view is shown along the longitudinal section 2—2 of Figure 1. From this figure it can be seen that the metallic handle 14 is tube or cup shaped and has a closed bottom portion 17 and an open upper portion designated by the reference numeral 18. The open upper portion 18 of the metallic handle 14 is formed with an over hanging lip 19 which engages a metallic mounting ring 20 having threaded bosses, one of which is shown at 21. A bolt 22 extends into the body 11 of the head 10 and mechanically connects the head 10 to the handle 14. The mounting ring 20 is provided with a central opening 23.

The reference numeral 24 designates generally the elements of an electrolytic capacitor. This electrolytic capacitor may be of the type formed by winding a pair of relatively long strips of aluminum foil separated by paper impregnated with electrolyte to form a tubular shaped capacitor. This tubular shaped capacitor is separated from the metallic handle 14 by means of a relatively thin bag or tube of insulating material 25 having a high dielectric strength and being impervious to the electrolyte of the capacitor. This material 25 insulates the electrodes of the capacitor, which are normally charged to a high potential of, say 500 volts, from the metallic handle 14 which the photographer holds. Also, the member 25 insures that the electrolyte of the electrolytic capacitor 24 does not come into contact with the metallic handle 14. This enables the metallic handle 14 to be made of a material other than the material from which the electrodes of the capacitor 24 are formed, if desired. As above mentioned, this enables the metallic handle 14 to be formed of a relatively hard material and the material which can be finished in a pleasing manner to both improve the appearance of the photographic flash unit and to protect the electrolytic capacitor 14 from damage due to jarring or dropping of the photographic flash unit.

Bag 25 may be made of the material known as Mylar, which is a condensation product of the dimethyl ester of terephtholic acid reacted with ethylene glycol, the product being drawn into a film under a two dimensional stress to provide proper molecular orientation. A polyethelene bag has also been used. However, Mylar is preferred. As an example of one modification used, bag 25 has a thickness of 0.003 inch, a dielectric strength of 4000 volts per mil, and the capacitor 24 was a 400 microfarad, 450 volt capacitor.

The upper end of the capacitor 24 and the bag 25 is sealed by pouring a wax into the upper end of the metallic handle 14. This wax solidifies and seals the electrolyte within the bag 25 as well as mechanically holds the capacitor 24 and bag 25 within the metallic handle 14. This wax is shown in its hardened form in Figure 2 and is designated by the reference numeral 26.

The capacitor 24 is provided with a pair of connector tabs 27 and 28 which are connected to the metallic foil of the capacitor 24. A pair of lead wires 29 and 30 are provided and extend through the wax 26 and through the opening 23 in the mounting ring 20 to make connection to the elements of the photographic flash system including the coiled cords 15 and 16 and the flash tube 13 of Figure 1.

Figure 2 shows the cross section of the handle of the photographic flash unit of Figure 1 taken on the section line 2—2. From this figure it can be seen that the handle of the photographic flash unit is generally circular in cross section and the shape of the capacitors 24 encased in the insulating bag 25 and positioned within the metallic handle 14 can be more clearly seen.

From the above description it can be seen that an improved photographic flash unit has been provided wherein an extremely compact, safe, and rugged unit has been provided having an outer metallic casing for the electrolytic capacitor which also form the metallic handle by which the photographic flash unit may be hand held.

These and other modifications of the present invention will be apparent to those skilled in the art and it is intended that the scope of the present invention be limited solely to the scope of the appended claims.

I claim as my invention:

1. A high voltage electric type photographic flash unit comprising; a tubular metallic handle member adapted to be hand held, a high voltage electrolytic capacitor within said metallic handle member, said handle member providing a rigid outer case for said capacitor, said electrolytic capacitor being formed of a pair of metallic strips separated by a dielectric to form a tubular capacitor having an outer diameter of approximately the same order as the inner diameter of said tubular handle, a bag of thin insulating material having a high dielectric constant and arranged to separate said electrolytic capacitor from said metallic handle member to thereby prevent electrical contact between said capacitor electrodes and said metallic handle member and to prevent the electrolyte of said electrolytic capacitor from contact with said metallic handle member, such insulating material being so thin that any excess material folded about the capacitor does not add appreciably to the diameter of the assembled capacitor and bag, a housing member having a reflector and a high voltage photoflash tube, means connecting the terminals of said capacitor to said photoflash tube and arranged to cause said photoflash tube to flash when desired, and means coupling said housing member to the open end of said metallic handle member.

2. A high voltage electric type photographic flash unit comprising; a tubular metallic handle member adapted to be hand held, a high voltage electrolytic capacitor within said metallic handle member, said handle member providing a rigid outer case for said capacitor, said electrolytic capacitor being formed of a pair of metallic strips separated by a dielectric to form a tubular capacitor having an outer diameter of approximately the same order as the inner diameter of said tubular handle, a bag of thin insulating material having a high dielectric constant and arranged to separate said electrolytic capacitor from said metallic handle member to thereby prevent electrical contact between said capacitor electrodes and said metallic handle member and to prevent the electrolyte of said electrolytic capacitor from contact with said metallic handle member, said metallic handle member being formed of a more durable metal than that of said metallic strips of said capacitor, such insulating material being so thin that any excess material folded about the capacitor does not add appreciably to the diameter of the assembled capacitor and bag, a housing member having a reflector and a high voltage photoflash tube, means connecting the terminals of said capacitor to said photoflash tube and arranged to cause said photoflash tube to flash when desired, and means coupling said housing member to the open end of said metallic handle member.

References Cited in the file of this patent

UNITED STATES PATENTS

| | | |
|---|---|---|
| 2,058,773 | Cole | Oct. 27, 1936 |
| 2,266,523 | Waterman | Dec. 16, 1941 |
| 2,624,831 | Farber | Jan. 6, 1953 |
| 2,646,672 | Fairbank | July 28, 1953 |
| 2,730,660 | Eilenberger | Jan. 10, 1956 |
| 2,740,339 | Carter | Apr. 3, 1956 |